April 3, 1928.
W. D. COIL ET AL
1,664,663
TURNING MECHANISM FOR CONVEYING DEVICES
Filed Sept. 7, 1926
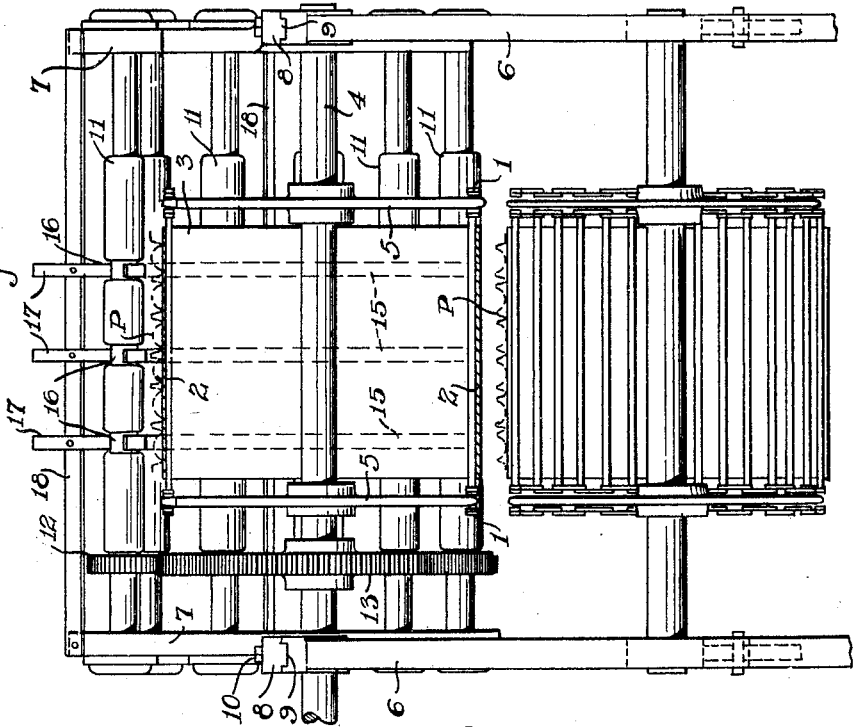
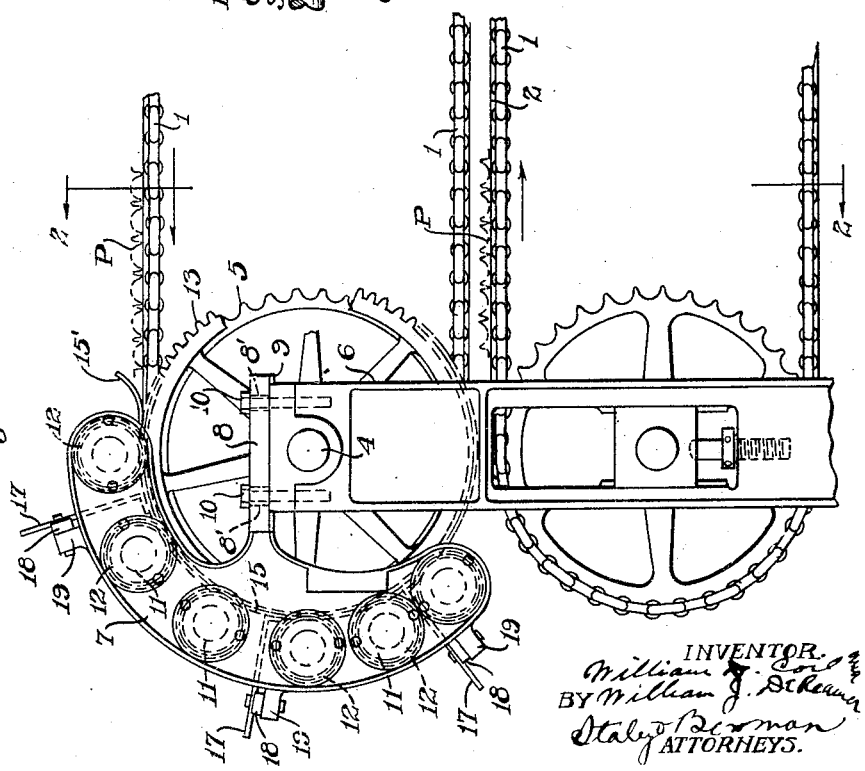

Patented Apr. 3, 1928.

1,664,663

UNITED STATES PATENT OFFICE.

WILLIAM D. COIL, OF MUNCIE, AND WILLIAM J. DE REAMER, OF CROWN POINT, INDIANA.

TURNING MECHANISM FOR CONVEYING DEVICES.

Application filed September 7, 1926. Serial No. 133,818.

This invention relates to turning mechanism for conveying devices, it particularly relating to mechanism which will guide and feed material which is passing about a drum or cylinder.

In machines in which material is carried about a drum or cylinder such as in endless conveyers which pass about a drum, and also in paper and other machinery in which the product is carried by cylinders or drums, it has been usual to provide turning or guiding mechanism arranged about a portion of the drum or cylinder to prevent displacement of the material passing about the same. This mechanism is usually in the form of an endless belt passing over rolls, which is effective for preventing the displacement of some products, but with other products, such as wet material or products molded from paper pulp, it has the effect of distorting the product to such an extent as to preclude the use of such turning means. With belts also, particularly when the products being conveyed about the drum are hot and wet, a rapid deterioration of the belt takes place rendering it useless in a comparatively short time.

The object of our invention is to provide a guiding mechanism of this character which will be simple in construction and effective in the operation of turning or guiding the product about a drum or cylinder without distortion of the products and which will be also of a character whose life of usefulness will be unaffected by heat or moisture.

The particular exemplification of our improvements shown in the drawings is a turning, guiding and feeding mechanism for the drums of endless conveyers, the particular conveyer shown in the drawings being for the purpose of carrying products molded from paper pulp through a drying oven, the particular products in this case being what are known as "flats" for egg fillers which are molded to a shape to receive the ends of eggs, these flats forming division walls between the cells of the fillers. It is to be understood, however, that our invention is not limited to this particular kind of conveying apparatus, nor in fact to endless conveying devices, but may be successfully employed in connection with drums or cylinders in other kinds of machinery which carry material or products about the same and which require some provision for retaining the material or products thereon.

In the accompanying drawings:

Fig. 1 is a side elevation of a portion of an endless conveyer and one of its turning drums showing our improvements applied thereto.

Fig. 2 is a section on the line 2—2 of Fig. 1.

Referring to the drawings, 1 represents the chains of an endless conveyer 2 of any suitable construction. One of the turning drums for this endless conveyer is shown at 3, this drum being keyed to the shaft 4 which is driven from any suitable source of power. The chains 1 run about sprocket wheels 5 also keyed to the shaft. Vertical standards 6 support the shaft and these standards also form the support for our improved guiding and feeding devices to be now described.

Secured to the upper end of each standard is a bracket 7, this bracket being formed on the arc of a circle to provide a support concentric to the axis of the drum. The bracket has an integrally formed arm 8, the under surface of which has a tongue 9 which fits a groove formed in the upper end of the standard 6, and bolts 10 secure the arm to the standard. The openings through the arm are elongated, as indicated in dotted lines at 8' to permit the necessary adjustment to bring the gears properly in mesh. Mounted in suitable bearings in these brackets 7 are a series of rolls 11, six of these rolls being employed in the present installation. Each roll is provided with a pinion 12 which is in mesh with a gear 13 keyed to the shaft 4.

Also supported by the brackets are a series of curved guide strips 15, three in number in the present case. These guide strips extend between the rolls 11 and the drum, the rolls being formed with a series of peripheral grooves 16 to accommodate the strips. To support the strips, each strip is provided with a plurality of arms 17 which are attached to cross bars 18 secured to lugs 19 formed integrally with the brackets. Those ends of the guide strips 15 which face the approaching product or material carried by the conveyer are preferably upturned as indicated at 15'.

In operation, with the parts moving in the direction of the arrow shown in Fig. 1, the product P carried by the conveyer as it passes about the drum is received by the rotating guide and feed rolls and curved guide strips and retained on the conveyer during its passage about the drum without distortion of the products, the rolls acting not only to guide the material but also to assist in feeding the same by coacting with the moving conveyer. The guide strips 15 serve to hold the product to the conveyer at those points between the rolls. The rolls and guide strips may be made of any suitable material to resist heat and moisture, being preferably constructed of metal, so that little or no deterioration of the turning mechanism occurs as would be the case with belts constructed of leather, fabric or similar material.

After the product leaves the turning mechanism, it is deposited upon another conveyer and conveyed back through the drying oven or other suitable point.

Having thus described our invention, we claim:

1. In a mechanism of the character described, supporting standards, a rotatable shaft journaled in said standards, a drum fast to said shaft, a gear fast to said shaft, a series of guide and feed rollers arranged about the drum in concentric relation therewith with their peripheries having a direct contact with the material being conveyed about said drum, and a pinion connected with each roll in mesh with said gear.

2. In a mechanism of the character described, a rotatable cylindrical conveying member, supporting standards by which said conveying member is supported, a gear connected with said member, a bracket carried by each supporting standard, a series of rolls journaled in said brackets about the periphery of said conveying member with their peripheries having a direct contact with the material being conveyed about said conveying member, and a pinion carried by each roll in mesh with said gear.

3. In a mechanism of the character described, a rotatable cylindrical conveying member, a series of guide and feed rolls arranged about a portion of the periphery thereof, and a series of curved guide strips supported between said feed rolls and said conveying member.

4. In a mechanism of the character described, a rotatable cylindrical conveying member, a series of guide and feed rolls arranged about a portion of the periphery thereof, and a series of curved guide strips supported between said feed rolls and said conveying member, each of said rolls being provided with a series of grooves to receive said guide strips.

5. In a mechanism of the character described, a rotatable cylindrical conveying member, supporting standards for said members, a bracket secured to each supporting member, a series of guide and feed rolls carried by said brackets arranged about the periphery of said conveying member, cross bars connecting said brackets, and a series of curved guide strips connected with said cross bars and arranged between said feed and guide rolls and said conveying member.

6. In a mechanism of the character described, a conveying member movable about an axis, and a series of rolls arranged about at least a portion of the periphery of said conveying member with the axes of said rolls in parallel relation with the axis about which said conveying member turns, said rolls lying adjacent a substantial portion of the width of said conveying member, with their peripheries having a direct contact with the material being conveyed about said member.

7. In a mechanism of the character described, a conveying member movable about an axis, a series of rolls arragned about at least a portion of the periphery of said conveying member with the axes of said rolls in parallel relation with the axis about which said conveying member turns, said rolls lying adjacent a substantial portion of the width of said conveying member, with their peripheries having a direct contact with the material being conveyed about said member, and means for rotating said rolls.

8. In a mechanism of the character described, a conveying member movable about an axis, a series of rolls arranged about at least a portion of the periphery of said conveying member with the axes of said rolls in parallel relation with the axis about which said conveying member turns, said rolls lying adjacent a substantial portion of the width of said conveying member with their peripheries having a direct contact with the material passing about said member, a gear rotatable upon the same axis with said conveying member, and pinions connected with each roll in mesh with said gear.

9. In a mechanism of the character described, a rotatable drum, an endless carrier movable about said drum, and a series of rolls arranged about at least a portion of the periphery of said drum with their axes in parallel relation with the axis of said drum, said rolls lying adjacent a substantial portion of the width of said endless carrier with their peripheries having a direct contact with the material being conveyed by said carrier.

10. In a mechanism of the character described, a rotatable drum, an endless carrier movable about said drum, a series of rolls arranged about at least a portion of the periphery of said drum with their axes in parallel relation with the axis of said drum, said rolls lying adjacent a substantial portion of the width of said endless carrier with their peripheries having a direct contact with the material being conveyed by said carrier, and means for rotating said rolls.

11. In a mechanism of the character described, a rotatable drum, an endless carrier movable about said drum, and a series of rolls arranged about at least a portion of the periphery of said drum with their axes in parallel relation with the axis of said drum, said rolls lying adjacent a substantial portion of the width of said endless carrier with their peripheries having a direct contact with the material being conveyed by said carrier, a gear rotatable with said drum, and pinions connected with each roll in mesh with said gear.

12. In a mechanism of the character described, a conveying member movable about a horizontal axis, and a series of rolls arranged about at least a portion of the periphery of said conveying member having horizontal axes in parallel relation with the horizontal axis about which the conveying member turns, said rolls lying adjacent a substantial portion of the width of said conveying member with their peripheries having a direct contact with the material passing about said conveying member.

13. In a mechanism of the character described, a drum rotatable about a horizontal axis, an endless carrier movable about said drum, and a series of rolls arranged about at least a portion of the periphery of said drum having horizontal axes in parallel relation with the horizontal axis of said drum, said rolls lying adjacent a substantial portion of the width of said endless carrier with their peripheries having a direct contact with the material being conveyed by said carrier.

In testimony whereof, we have hereunto set our hands this 2nd day of September, 1926.

WILLIAM D. COIL.
WILLIAM J. DE REAMER.